(12) United States Patent
Vincelli

(10) Patent No.: US 9,260,591 B1
(45) Date of Patent: *Feb. 16, 2016

(54) HYDROSEED SUBSTRATE AND METHOD OF MAKING SUCH

(71) Applicant: Fred Vincelli, Clearwater Beach, FL (US)

(72) Inventor: Fred Vincelli, Clearwater Beach, FL (US)

(*) Notice: Subject to any disclaimer, the term of this patent is extended or adjusted under 35 U.S.C. 154(b) by 471 days.

This patent is subject to a terminal disclaimer.

(21) Appl. No.: 13/706,676

(22) Filed: Dec. 6, 2012

Related U.S. Application Data

(63) Continuation of application No. 13/422,581, filed on Mar. 16, 2012, now Pat. No. 8,349,204, which is a continuation of application No. 13/044,101, filed on Mar. 9, 2011, now Pat. No. 8,163,194, which is a continuation-in-part of application No. 12/492,273, filed on Jun. 26, 2009, now Pat. No. 8,163,192.

(51) Int. Cl.
*C08L 1/00* (2006.01)

(52) U.S. Cl.
CPC .......................... *C08L 1/00* (2013.01)

(58) Field of Classification Search
CPC ........................................................ C08L 1/00
See application file for complete search history.

(56) References Cited

U.S. PATENT DOCUMENTS

| | | | |
|---|---|---|---|
| 5,290,894 A | | 3/1994 | Melrose et al. |
| 5,429,741 A | * | 7/1995 | Webb et al. ................. 210/242.4 |
| 6,740,342 B1 | | 5/2004 | Hulst et al. |
| 8,163,192 B2 | | 4/2012 | Vincelli, Sr. |
| 8,163,194 B2 | * | 4/2012 | Vincelli, Sr. ...................... 252/1 |
| 8,349,204 B2 | * | 1/2013 | Vincelli, Sr. ...................... 252/1 |
| 2002/0074295 A1 | * | 6/2002 | Cohen et al. .................. 210/723 |
| 2004/0250971 A1 | | 12/2004 | Lopez |
| 2005/0170734 A1 | | 8/2005 | Yang et al. |
| 2005/0192365 A1 | | 9/2005 | Strandburg et al. |
| 2007/0298209 A1 | | 12/2007 | Kohlman et al. |
| 2008/0138248 A1 | | 6/2008 | Viovy et al. |
| 2008/0221247 A1 | | 9/2008 | Sajot et al. |

FOREIGN PATENT DOCUMENTS

DE 102007003649 A1 7/2008

* cited by examiner

*Primary Examiner* — Peter F Godenschwager
(74) *Attorney, Agent, or Firm* — Larson & Larson, P.A.; Frank Liebenow; Patrick Reid

(57) ABSTRACT

A Hydroseed substrate for mixing with other ingredients such as water, seeds, fertilizer, wetting agents and dye, to produce Hydroseeding slurry is disclosed. The substrate includes cellulose materials (e.g. cardboard, paper) and an absorbent. The absorbent is a superabsorbent polymer such as linear polyacrylamide ($-CH_2CHCONH_2-$) or copolymers of acrylamide ($C_3H_5NO$) polymers. The superabsorbent polymer improves moisture retention, improves viscosity, reduces friction, and improves coverage of the hydroseed mixture and germination of the seed.

18 Claims, 3 Drawing Sheets

HYDROSEED SUBSTRATE AND METHOD OF MAKING SUCH

RELATED APPLICATIONS

This application is a continuation of co-pending application Ser. No. 13/422,581, titled "HYDROSEED SUBSTRATE AND METHOD OF MAKING SUCH", filed Mar. 16, 2012, which is in turn is a continuation of co-pending application Ser. No. 13/044,101, titled "HYDROSEED SUBSTRATE AND METHOD OF MAKING SUCH", filed Mar. 9, 2011, which is in turn a continuation-in-part of co-pending application Ser. No. 12/492,273, titled "HYDROSEED SUBSTRATE AND METHOD OF MAKING SUCH", filed Jun. 26, 2009, the disclosure of both are hereby included by reference.

FIELD

This invention relates to the field of agriculture and more particularly to a hydroseed substrate and a method of making such.

BACKGROUND

Hydroseeding is well known and consists of mixing seeds, water, and a substrate into a slurry and spreading the slurry over an exposed area of soil. The substrate provides a cover mat to the soil, holding moisture in while reducing sunlight on the soil, thereby preventing weed seeds in the soil from sprouting. Often, fertilizer, minerals, dyes and/or tacking agents, etc., are added to the slurry to improve germination, moisture retention and growth.

Hydroseeding is an improvement over traditional soil preparation and broadcast seeding since it promotes quick germination and provides mulch to reduce soil erosion. Hydroseeding is a lower cost alternative to sod, requiring less preparation, less transportation costs, lower material costs, less labor and faster deployment.

Hydroseeding is also referred to as hydraulic mulch seeding, hydro-mulching or hydra-seeding, and includes a tank of slurry. The slurry is sprayed evenly over exposed soil. Hydroseeding is usually performed using a truck specifically designed for Hydroseeding and the truck usually has a tank, air compressor for pressurizing the tank or other means for distributing the slurry, a hose to transport the slurry from the truck and a nozzle that forms a spray of slurry under an operator control. Given such a device, a single operator is capable of seeding a very large area in a matter of minutes. Hydroseeding has also been performed from low-flying aircraft in areas that are without any road infrastructure such as forests, in particular, after a forest fire. In such, it is anticipated that Hydroseeding is performed without seed (e.g., a slurry of a substrate, minerals, fertilizer and water) to re-grow an area of the forest without introducing non-native plant species.

Hydroseeding is also used to seed areas with other plant seeds such as wildflower seeds or combinations of grass seed and other plant seeds.

When introduced in the early 1950s, shredded and ground newspaper was often used as the substrate. Later, more advanced substrate formulas were deployed including components such as paper, wood fibers and polymers. For example, U.S. Pat. No. 6,158,167 to Spittle describes mulch flakes made from finely divided paper and/or wood with added surfactants. This patent claims that, once sprayed on the ground, these flakes reduce water run-off and soil erosion.

Current substrates typically are made from grinding wood fiber (100%) or a mixture of wood fiber and newspaper (e.g., 70% wood fiber and 30% newspaper) and adding dye and surfactants.

What is needed is a substrate that will improve water absorbency while maintaining a homogenous viscosity of the slurry.

SUMMARY

The present invention includes a substrate for mixing with other ingredients such as water, seeds, fertilizer, wetting agents, dye, to produce Hydroseeding slurry. The substrate includes any cellulose material such as paper and/or cardboard along with a material known as diaper fluff (tampon fluff, adult diaper fluff) and/or linear polyacrylamide. The diaper fluff improves moisture retention, improves viscosity, reduces friction and improves coverage and germination.

In one embodiment, the cellulose material is cardboard (e.g. double-line, Kraft fibers) and/or paper (e.g. recycled newspaper). In other embodiments, the cellulose material is wood (e.g. wood shavings, mulch, wood fibers). In other embodiments, the cellulose material is any combination of cardboard, paper and wood.

In another embodiment, a Hydroseeding substrate is disclosed including up to 99 percent by weight ground cardboard, up to 99 percent by weight ground paper, and at least 1 percent and less than 10 percent of ground diaper fluff or linear polyacrylamide.

In another embodiment, a method of making a Hydroseed slurry is disclosed including providing diaper fluff and cellulose and then grinding the cellulose into a substrate then adding the diaper fluff or linear polyacrylamide to the substrate. The substrate is then mixed with water and seed to form a slurry.

In another embodiment, method of Hydroseeding is disclosed including providing diaper fluff and cellulose then grinding the cellulose into a substrate. Next, the diaper fluff or linear polyacrylamide is added to the substrate. Next, the substrate is mixed in a Hydroseed mixer with, water and seed into a slurry. The slurry is pumped through a nozzle and sprayed on soil where the seed is to grow.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
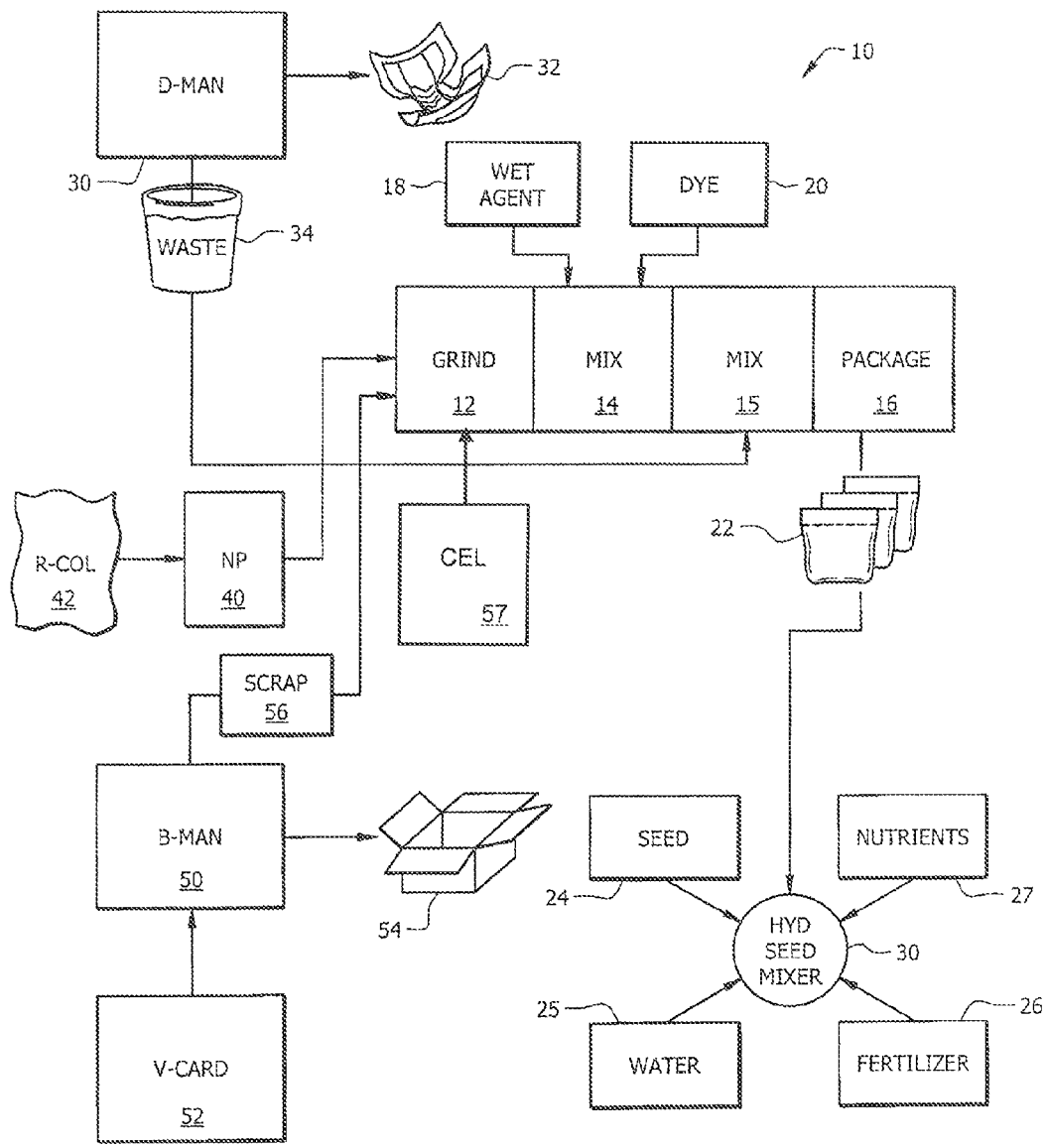
FIG. 1 illustrates a schematic view of a hydroseed manufacturing system.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a schematic view of a hydroseed manufacturing system is shown. Diaper fluff is a waste byproduct of, for example, disposable diaper production 30 (or tampon production, etc.) and is a good source of linear polyacrylamide (PAM). During the production of disposable diapers 30, etc., fibrous material is cut, trimmed and shaped, producing disposable diapers 32, as known in the industry. The trimmings become waste 34, known as diaper fluff 34. Diaper fluff, by design, is highly absorbent. Disposable diapers 32 need to absorb and/or coagulate liquids (urine) and, therefore, diaper fluff or linear polyacrylamide (PAM) 34 is an excellent source of a material that absorbs and/or coagulates liquids (e.g. water). The absorbency of diapers 32 and diaper fluff 34 is enhanced by several materials included in the diaper fluff 34 such as cellulose pulp, linear polyacrylamide ($-CH_2CHCONH_2-$), polymers, superabsorbent polymers, copolymers of acrylamide $C_3H_5NO$, polymers, etc. Superabsorbent polymers are polymers that can absorb and retain large amounts of a liquid relative to their own mass or weight. This list refers to a group of absorbents.

Diaper fluff 34 is an excellent source of these absorbents. Diaper fluff 34 and/or these absorbents provide absorbency and/or coagulation characteristics to the hydroseed mixture. It has been determined that the addition of these absorbents (e.g. diaper fluff or linear polyacrylamide (PAM) 34) to hydroseed substrate greatly improves the viscosity of the slurry (when mixed with water and other ingredients) and the slurry holds and retains more moisture, thereby improving germination and seed growth. It is anticipated that diaper fluff or linear polyacrylamide (PAM) 34 is available as from other sources other than diaper production waste. Prior to the disclosed method and composition, the waste/diaper fluff 34 went into landfills.

It is also anticipated that diaper fluff or linear polyacrylamide (PAM) 34 be obtained from the production of other similar, highly absorbent products such as personal hygiene products.

In parallel, paper (e.g. virgin paper, recycled newspaper, newsprint, etc.) is collected 42 creating a stock of paper 40. In the past, much of the recycled paper 40 was used to create new paper, but there is a limit to the percentage of recycled paper that is used in paper production due to the breakdown of fibers. The present invention utilizes any paper 40.

Also in parallel, cardboard box manufacturers 50 accept virgin cardboard 52 and produce cardboard boxes 54. Since the virgin cardboard 52 starts as sheets or rectangular sections, it is often trimmed, punched or cut, often producing virgin cardboard scrap 56. In the past, the virgin cardboard scrap 56 was sent to pulping mills or wound up in landfills. The present invention utilizes any cardboard 56, although virgin cardboard 56 is preferred.

Also, in parallel, other forms of cellulous are collected and refined 57 through known pulping processes into a pulp. These sources of cellulose include, but not limited to, saw dust, wood chips, building scrap, tree limbs and branches, etc.

The hydroseed manufacturing system combines amounts of newspaper 40, virgin cardboard scrap 56 and/or wood in a grinding process 12, grinding these forms of cellulous into the proper consistency, mixing 14 with any optional ingredients such as wetting agents 18 and dyes 20 which are often added in liquid form. Next, the diaper fluff or linear polyacrylamide (PAM) 34 is mixed 15 into the material to complete the substrate and then packaged 16. For example, the resulting substrate 22 is packaged in bales similar to bales in which peat moss is often delivered. It is preferred that the diaper fluff 34 be added after any liquid components 18/20 are thoroughly mixed and absorbed into the cardboard 56 and/or paper 40 and/or wood so the diaper fluff 34 doesn't react with and/or begin to absorb the liquids 18/20.

The resulting substrate 22 is later (prior to application) mixed with other ingredients in a hydroseed mixer 30 (e.g., a truck designed for Hydroseeding). In this, other desired ingredients such as water 25, nutrients 27, seeds 24 and fertilizer 26 are added to the substrate 22 forming the slurry that is then sprayed on the area to be seeded.

The addition of diaper fluff or linear polyacrylamide (PAM) 34 provides for greater water absorption above that of the prior use of cardboard and/or paper without diaper fluff or linear polyacrylamide (PAM) 34. The resulting slurry 30 holds more moisture, thereby increasing germination. Furthermore, the resulting slurry is more homogenous, having a more consistent viscosity, thereby reducing settling in the slurry tank of the spreading vehicle and providing a more even application. The diaper fluff or linear polyacrylamide (PAM) 34 also reduces friction of the slurry, making it more slippery, thereby creating fewer clogs in spray equipment and nozzles. It is anticipated that such provides for a greater coverage area to sprayers. Furthermore, once applied to soil, the coagulation properties of the diaper fluff or linear polyacrylamide (PAM) 34 improves the slurry's ability to reduce erosion, especially on hills or where run-off is possible.

The mixture includes virgin cardboard 56, paper 40 and/or wood that is ground together with, diaper fluff or linear polyacrylamide (PAM) 34 to produce the substrate. Optional dyes and surfactants are added to the ground cardboard 56 and paper 40 before introduction of the diaper fluff 34 to permit absorption of the dye and/or surfactant since these are often and preferably in liquid form. The ratio of materials is very important to the resulting substrate 22 and, eventually, the slurry. If too much diaper fluff or linear polyacrylamide (PAM) 34 is added, the resulting slurry will coagulate and not be usable for Hydroseeding. The ideal combination of ingredients is around 70% cardboard 56, 26% paper 40 and 4% diaper fluff or linear polyacrylamide (PAM) 34. It has been found that virgin cardboard 56 works best, although it is anticipated that recycled cardboard is used in some embodiments of the present invention. Although recycled paper 40 works well, it is anticipated that any paper 40 is used in some embodiments of the present invention.

As an example, a preferred formula includes 35 lb of cardboard 56, 13 lb of paper 40 and 2 lb of diaper fluff or linear polyacrylamide (PAM) 34. It is anticipated that a small amount of plastic liner is included in the diaper fluff 34 and such is not detrimental to the resulting substrate 22 and eventual slurry.

In other embodiments, between 1% and 10% diaper fluff 34 is used, the remaining 90% to 99% of the substrate 22 is made up of a combination of zero to 99% cardboard 56, zero to 99% paper 40 and zero to 99% wood. For example, in one embodiment, the substrate 22 comprises 99% cardboard 56 and 1% diaper fluff or linear polyacrylamide (PAM) 34. In another example, the substrate 22 comprises 96% paper 40 and 4% diaper fluff 34. In another example, the substrate 22 comprises 80% cardboard 40, 16% paper 56 and 4% diaper fluff or linear polyacrylamide (PAM) 34. In another example, the substrate 22 comprises no paper 40, 98% cardboard 56 and 2% diaper fluff or linear polyacrylamide (PAM) 34.

It has been shown that the resulting substrate 22 is capable of absorbing approximately 1700 times its weight in water whereas the prior substrates made of wood fiber or wood fiber and newspaper without diaper fluff are estimated to absorb around 1000 to 1200 times their weight in water.

Figure 2:
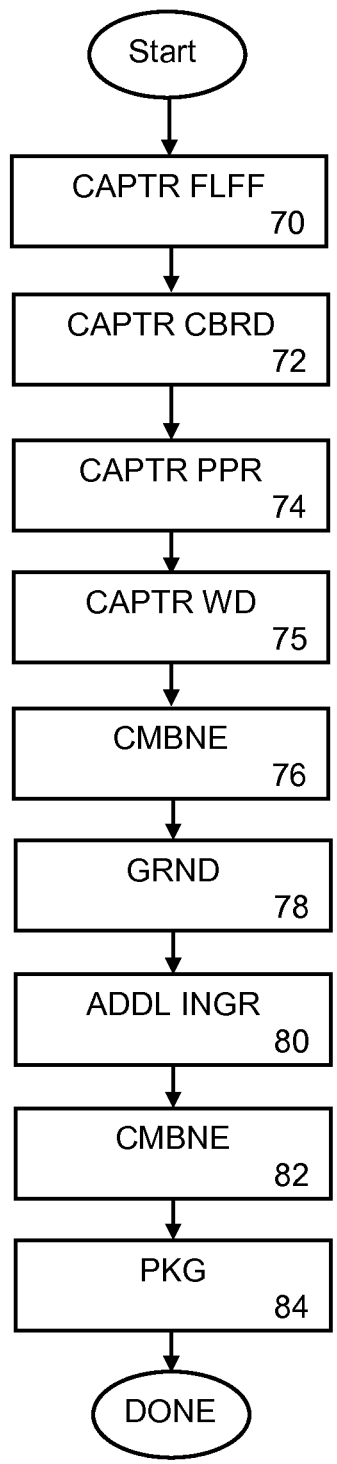
FIG. 2 illustrates a flow chart of hydroseed manufacturing.

Referring now to FIG. 2, a flow chart of the hydroseed manufacturing system will be described. The method begins at the diaper manufacturer 30, source of cardboard 50, source of paper 42 and source of wood 57. At the diaper manufacturer 30, waste 34 (diaper fluff) is collected. At the box manufacturer 50 (recycler, etc), scrap 56 is collected 72. At the paper recycling operation 42 (newspaper recycle, book manufacturer, shredder, etc), paper 40 is collected 74. Wood is supplied 57 from any source of wood chips, saw dust, scrap wood, fallen limbs and branches, etc. The appropriate mix of cardboard 56, paper 40 and wood 57 is combined 76 and ground 78 into the appropriate particle size then any additional ingredients are added 80 such as wetting agents 18 and/or dye 20. Since it is preferred that the wetting agent 18 and/or dye 20 are fluids, the wetting agent 18 and/or dye 20 are absorbed in the cardboard 56, paper and/or wood 57 before the diaper fluff or linear polyacrylamide (PAM) 34 is combined/mixed 82. After the diaper fluff or linear polyacrylamide (PAM) 34 is added and mixed 82, the resulting substrate 22 is packaged 84. Although described using specific sources of cardboard, paper and/or wood, any other sources of cardboard, paper and/or wood are anticipated.

Figure 3:
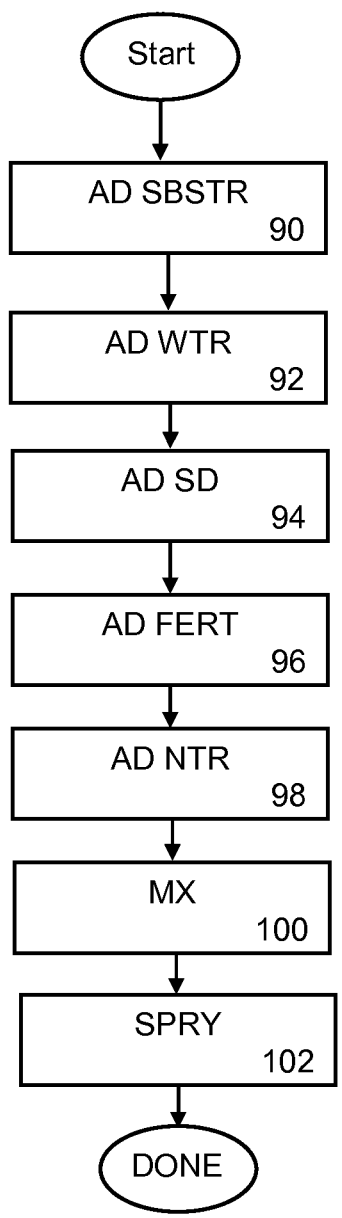
FIG. 3 illustrates a flow chart of deployment of the hydroseed.

Referring to FIG. 3, a flow chart of deployment of the hydroseed is shown. Deployment is often performed in a specialized truck or airplane, as known in the industry. The substrate 22 is added 90 to the mixer 30. Water 25 is added 92 and seed 24 is added 94. If needed, fertilizer 26 (e.g., nitrogen) is added 96. If needed, nutrients 27 (e.g., iron) are added 98. The order of adding ingredients is not significant. The substrate 22, water 25, seed 25 and optional fertilizer 26 and nutrients 27 are mixed 100 into the slurry and sprayed 102 on the soil where growth of the seeds is desired.

Throughout the description, the term "diaper fluff" refers to any material that is more absorbent than cardboard, paper and/or wood such as linear polyacrylamide (PAM) ($—CH_2CHCONH_2—$), polymers, superabsorbent polymers, copolymers of acrylamide $C_3H_5NO$, polymers, etc. Diaper fluff 34 is an excellent source of some or all of these superabsorbent materials and is readily available as waste from other manufacturing processes.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A Hydroseeding substrate comprising:
   between 1 percent and 99 percent by weight ground cardboard;
   up to 99 percent by weight ground paper; and
   at least 1 percent by weight and less than 10 percent by weight of linear polyacrylamide;
   said ground cardboard, ground paper and linear polyacrylamide combined together and constituting a hydroseed substrate for mixing with water and seed to form a hydroseed slurry.

2. The Hydroseeding substrate of claim 1, wherein the ground cardboard is virgin cardboard.

3. The Hydroseeding substrate of claim 1, wherein the ground cardboard is approximately 70 percent by weight of the slurry, the ground paper is approximately 26 percent by weight of the slurry and the linear polyacrylamide is approximately 4 percent by weight of the substrate.

4. The Hydroseeding substrate of claim 1, wherein the substrate comprises approximately 96 percent by weight of the ground paper and approximately 4 percent by weight of the linear polyacrylamide.

5. The Hydroseeding substrate of claim 1, wherein the ground paper is recycled newsprint.

6. The Hydroseeding substrate of claim 1, further comprising a dye.

7. The Hydroseeding substrate of claim 1, further comprising a wetting agent.

8. A Hydroseeding substrate comprising:
   between 1 percent and 99 percent by weight ground cardboard;
   up to 99 percent by weight ground paper; and
   at least 1 percent by weight and less than 10 percent by weight of a superabsorbent polymer;
   said ground cellulose, ground cardboard, ground paper and superabsorbent polymer combined together and constituting a hydroseed substrate for mixing with water and seed to form a hydroseed slurry.

9. The Hydroseeding substrate of claim 8, wherein the superabsorbent polymer is one or more polymers selected from the group consisting of linear polyacrylamide ($—CH_2CHCONH_2—$), and copolymers of acrylamide ($C_3H_5NO$) polymers.

10. The Hydroseeding substrate of claim 9, wherein the ground cardboard is approximately 70 percent by weight of the slurry, the ground paper is approximately 26 percent by weight of the slurry and the superabsorbent polymer is approximately 4 percent by weight of the substrate.

11. The Hydroseeding substrate of claim 9, wherein the substrate comprises approximately 96 percent by weight of the ground paper and approximately 4 percent by weight of the superabsorbent polymer.

12. The Hydroseeding substrate of claim 8, wherein the ground paper is recycled newsprint.

13. The Hydroseeding substrate of claim 8, further comprising a dye.

14. A Hydroseeding substrate comprising:
   between 1 percent and 99 percent by weight ground cardboard;
   up to 99 percent by weight ground paper; and
   at least 1 percent by weight and less than 10 percent by weight of a superabsorbent polymer selected from the group consisting of linear polyacrylamide ($—CH_2CHCONH_2—$), and copolymers of acrylamide ($C_3H_5NO$) polymers;
   said ground cardboard, ground paper, and superabsorbent polymer combined together and constituting a hydroseed substrate for mixing with water and seed to form a hydroseed slurry.

15. The Hydroseeding substrate of claim 14, wherein the ground cardboard is approximately 70 percent by weight of the slurry, the ground paper is approximately 26 percent by weight of the slurry and the superabsorbent polymer is approximately 4 percent by weight of the substrate.

16. The Hydroseeding substrate of claim 14, wherein the substrate comprises approximately 96 percent by weight of the ground paper and approximately 4 percent by weigh of the superabsorbent polymer.

17. The Hydroseeding substrate of claim 14, wherein the ground paper is recycled newsprint.

18. The Hydroseeding substrate of claim 14, further comprising a dye.

* * * * *